G. E. NORRIS,

Assignor, by mesne assignments, to W. F. BIDWELL; said BIDWELL assignor of two-thirds to said NORRIS and J. K. P. PINE.

SPRING BOARD FOR VEHICLES.

No. 9,998. Reissued Jan. 3, 1882.

Witnesses:
Charles S. Bintnall
Justus Kellogg.

Inventor:
Geo. E. Norris

N. PETERS, Photo-Lithographer, Washington, D. C.

UNITED STATES PATENT OFFICE.

GEORGE E. NORRIS, OF TROY, ASSIGNOR, BY MESNE ASSIGNMENTS, TO WM. F. BIDWELL, OF GLENS FALLS, NEW YORK; SAID BIDWELL ASSIGNOR OF TWO-THIRDS TO SAID NORRIS AND JAMES K. P. PINE, OF SAME PLACE.

SPRING-BOARD FOR VEHICLES.

SPECIFICATION forming part of Reissued Letters Patent No. 9,998, dated January 3, 1882.

Original No. 154,892, dated September 8, 1874. Application for reissue filed December 3, 1881.

*To all whom it may concern:*

Be it known that I, GEORGE E. NORRIS, of the city of Troy, county of Rensselaer, and State of New York, and formerly a resident of Glens Falls, Warren county, same State, have invented a new and Improved Support for the Spring-Boards of Wagons, of which the following is a specification.

My invention relates to that class of vehicles which are called "buck-board wagons," and which are constructed with a spring-board the ends of which are supported upon the head block and hind axle.

The object of my invention is to provide an elastic support for the spring-board which is adjustable, and one that will yield with the board under pressure, and by which the board may be kept level or crowned, as may be required. By thus combining with the board a support it may be made of much lighter material and still have all the required elements of strength.

My invention consists in the combination, with a spring-board, of a crescent or C shaped spring, which is firmly secured to the board about midway between the ends of the latter, and each end of the spring connected with the board near its end with an adjustable brace-rod.

My invention also consists in the combination, with a spring-board, of a crescent or C shaped spring, which is firmly secured to the board about midway between the ends of the latter, and each end of the spring connected with the board near its end, and an intermediate spiral spring placed so as to connect with the arms of the crescent-shaped spring or with the latter and the inner ends of the rods.

Figure 1:
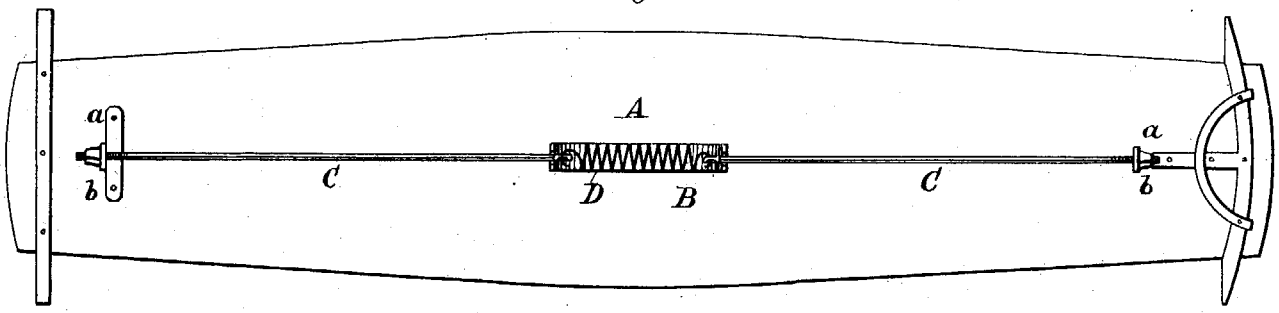
Figure 2:
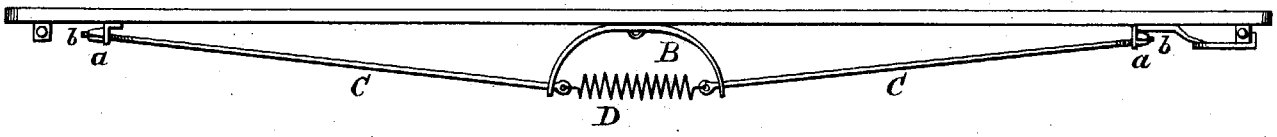

In the accompanying drawings there are two figures illustrating my invention, and in both of which the same designation of parts by letter reference are used. Figure 1 shows a view of the under side of the spring-board and the combined spring-support. Fig. 2 illustrates a side elevation of the same device.

In the drawings, A designates the spring-board, to which there is firmly secured about midway between the ends the crescent-shaped spring B. To the ends of the latter are attached the brace-rods C C, which are shown in the drawing as extending nearly to the ends of the board and as passing through L-shaped lugs which are attached to the board. Upon the ends of these rods, where extending beyond the lugs, are arranged the nuts *b b*. With the spring thus connected with the board at its center, and having an adjustable connection with the ends of the board, when the latter rises or falls under tension the spring-support adjustably rises and falls with it.

To the ends of the spring B there may be applied the spiral spring D, if desired, and the brace rods C C may be applied to connect with the spiral spring or crescent spring, or to both, as desired.

By setting the nuts the board may be kept level or crowned, so as to give to it an easy riding and elastic motion, and the tension of the spring may be regulated by the nuts as may be required.

Having thus described my invention, what I claim, and desire to secure by Letters Patent, is—

1. As an improvement in wagon spring-boards, the combination, with the board, of a central supporting spring or springs and longitudinal adjustable brace-rods, substantially as specified.

2. In combination with the wagon spring-board A, the crescent-shaped spring B, attached to the board about midway between its ends and adjustably connected with the board near the ends of the latter, substantially as herein shown and described.

3. In combination, the wagon spring-board A, the crescent-shaped spring B, firmly attached to the spring-board about midway between the ends of the latter, and the connecting brace-rods C C, connecting the arms of the spring with the board adjustingly at or near the ends of the board, substantially as shown and described.

4. In a wagon spring-board, the combination of the board A, the crescent-shaped spring B, the connecting-rods C C, the lugs *a a* upon the board, and the nuts *b b* upon the outer ends of the rods, as and for the purposes described and set forth.

5. The combination of the board A, the crescent-shaped spring B, attached to the board, the spiral spring D, and the adjustable brace-rods C C, arranged to operate as herein shown and described.

Signed at Troy, New York, this 22d day of November, 1881.

GEO. E. NORRIS.

Witnesses:
JUSTIN KELLOGG,
CHARLES S. BRINTNALL.